United States Patent [19]

Brandle et al.

[11] Patent Number: 5,218,699

[45] Date of Patent: Jun. 8, 1993

[54] REMOTE PROCEDURE CALLS IN HETEROGENEOUS SYSTEMS

[75] Inventors: Richard T. Brandle, Marietta; Don L. Goodliffe, Dunwoody; Donald E. Keith, Peachtree City; Randy A. Robinette; Robert C. Sizemore, both of Acworth; Garry J. Smithwick, Alpharetta; Anthony J. Zappavigna, Marietta, all of Ga.

[73] Assignee: International Business Machines Corporation, Armonk, N.Y.

[21] Appl. No.: 895,221

[22] Filed: Jun. 8, 1992

Related U.S. Application Data

[63] Continuation of Ser. No. 398,126, Aug. 24, 1989, abandoned.

[51] Int. Cl.$^5$ ............................................. G06F 13/14
[52] U.S. Cl. ..................................... 395/650; 395/200; 364/280.6; 364/284.3; 364/284.4; 364/DIG. 1
[58] Field of Search .................. 364/DIG. 1, DIG.2; 395/200, 365, 600, 650, 700, 725, 500

[56] References Cited

U.S. PATENT DOCUMENTS

| | | | |
|---|---|---|---|
| 3,593,300 | 7/1971 | Driscoll et al. | 364/200 |
| 3,657,736 | 4/1972 | Boom et al. | 364/200 |
| 4,205,371 | 5/1980 | Feather | 364/200 |
| 4,455,604 | 6/1984 | Ahlstrom et al. | 364/200 |
| 4,495,570 | 1/1985 | Kitajima et al. | 364/200 |
| 4,688,170 | 8/1987 | Waite et al. | 364/200 |
| 4,712,189 | 12/1987 | Mohri | 364/900 |
| 4,769,772 | 9/1988 | Dwyer | 364/200 |
| 4,780,821 | 10/1988 | Crossley | 364/200 |
| 4,851,988 | 7/1989 | Trottier et al. | 395/100 |
| 4,901,231 | 2/1990 | Bishop et al. | 364/200 |
| 4,914,571 | 4/1990 | Baratz et al. | 364/200 |
| 4,937,777 | 6/1990 | Flood et al. | 364/900 |

FOREIGN PATENT DOCUMENTS 0178235  4/1986  European Pat. Off. .
0138352  3/1988  European Pat. Off. .

OTHER PUBLICATIONS

European Computer Manufacturers Assoc, Standard E(MA-12) Dec., 1987 pp. 1–73.
A. D. Birrell et al., "Implementing Remote Procedure Calls", ACM Transactions On Computer Systems, vol. 2, No. 1, New York, U.S., Feb. 1984.
K. B. Sheets et al., "A Kernel Level Remote Procedure Call Mechanism", Compsac 87, Tokyo, JP, Oct. 7, 1987.
D. Notkin et al., "Heterogeneous Computing Environments: Report On The ACM Sigops Workshop On Accommodating Heterogeneity", Communications Of The Association For Computing Machinery, vol. 30, No. 2, New York, U.S., Feb. 1987.

Primary Examiner—David L. Clark
Assistant Examiner—John Loomis
Attorney, Agent, or Firm—Andrew J. Dillon; Paul W. O'Malley; Kenneth C. Hill

[57] ABSTRACT

A system for making procedure calls can be used with a network of computers. An application program on a local node calls a desired library procedure. The library procedure can be available on the local node or a remote node, and the location need not be known by the application. If the library procedure is available on a remote node, a remote router procedure communicates a procedure identifier to the remote node. The procedure is executed, and any results are returned to the locol node, to be returned to the application program.

8 Claims, 7 Drawing Sheets

REMOTE PROCEDURE CALLS IN HETEROGENEOUS SYSTEMS

This application is a continuation of application Ser. No. 07/398,126, filed Aug. 24, 1989 now abandoned.

CROSS-REFERENCE TO RELATED APPLICATIONS

This application contains subject matter described in co-pending U.S. application Ser. No. 320,086, filed Mar. 6, 1989 now U.S. Pat. No. 5,146,593, titled PROCEDURE CALL INTERFACE, and assigned to the assignee hereof.

BACKGROUND OF THE INVENTION

1. Technical Field

The present invention relates generally to computer systems, and more specifically to techniques for making procedure calls.

2. Background Art

Programming languages provide facilities for making procedure calls, whereby code which is reusable can be placed in a defined location and executed when needed. Parameters can be passed to called procedures, and results returned. As used herein, the term procedure will be used in a generic sense; program segments which are referred to in particular instances as procedures, functions, and subroutines will all be referred to herein as procedures.

Details of procedure calling conventions differ with different programming languages. Some parameters may be passed in registers, on a procedure stack, or in memory blocks pointed to by pointers held in a register or a stack location. Because of different calling conventions used by different languages, procedure calls must be made to procedures originally written in the same language, or another language using the same calling conventions. If it is desired to make a call to a procedure originally written in a different language, and the identity of the original language is known, special steps can sometimes be taken to restructure the call to function correctly with such procedure. This restructuring usually requires modification of the call at the assembly language level.

In many computer systems, including virtually all large and medium size systems, common libraries of procedures are maintained for standard and often used functions. These procedures, sometimes referred to as system services are called from application programs, freeing an applications programmer from writing and debugging code to perform common functions. Library functions can be linked to an application program at link time, or they may be dynamically linked at execution time if this is supported by the operating system.

The language calling convention problem described above exists with the use of procedure libraries. A library procedure must typically be written in each language supported by the system, so that multiple procedures exist for performing the same library function. An alternative is to have one or a limited number of procedures written in a particular language, and require applications programmers to perform whatever steps are necessary in order to call procedures written in different languages.

When several computer systems are connected together through a local network, it is desirable to share resources as much as possible. This is generally not feasible for library procedures, because prior art systems do not make provision for transparently calling procedures which are located on a different machine. This is especially true for non-homogeneous networks, in which procedure calling conventions can differ between different system architectures.

It would be desirable for a system to provide the ability for applications programs to call library procedures located on remote nodes attached to a network. It would further be desirable for such a system to allow the applications programs to call library procedures without knowing whether they are located on the local network node or on a remote node. It would also be desirable for such calls to be made to procedures written in a language using different procedure calling conventions without the necessity of language specific translations being made by the applications programs.

SUMMARY OF THE INVENTION

It is therefore an object of the present invention to provide a system and method which allows applications programs to make calls to library procedures which can be located on remote machines connected to a local machine by a network.

It is also an object of the present invention to provide such a system and method which allows applications programs to make calls to library procedures without knowing whether such library procedures are located on the local machine or a remote machine.

It is a further object of the present invention to provide such a system in which calls to a library procedure can be made from applications programs using a different procedure calling convention from that used by the library procedure.

Therefore, according to the present invention, a system for making calls to library procedures provides a standard interface for applications programs. Requests for library procedures are checked to see if the desired procedure is available locally or on a remote machine. Locally available procedures are performed locally. Procedures which are available on remote machines are invoked by communicating a procedure identifier and any necessary parameters to the remote machine. Results are returned to the local machine for use by the applications program.

BRIEF DESCRIPTION OF THE DRAWINGS

The novel features believed characteristic of the invention are set forth in the appended claims. The invention itself however, as well as a preferred mode of use, and further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

The software system described herein is suitable for use with nearly any general purpose digital computer. Mainframes, minicomputers, engineering workstations, and many desktop personal computers can support the system described below. Only minor modifications, within the ability of those skilled in the art, are needed for various existing language compilers as will be described below.

The terms library procedures, services and service procedures are used synonymously. Local node and local machine mean the computer on which an applications program is executing. Remote node and remote machine mean a computer which is connected to the local node by a communications link, such as a local area network.

Figure 1:
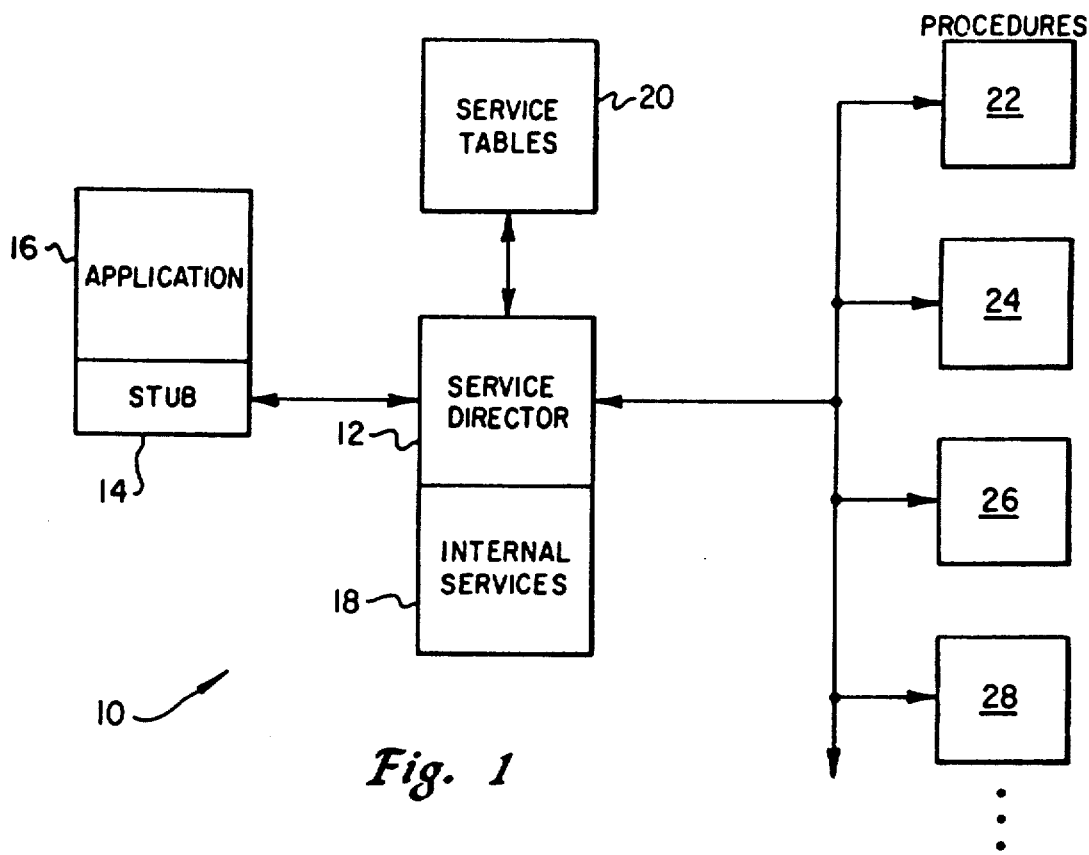
FIG. 1 is a block diagram of a system for calling library procedures on a local machine.

Referring to FIG. 1, a system 10 for handling library procedure calls which are available on the local node includes a service director 12. The service director 12 is a software procedure which is called by a stub procedure 14. The stub procedure 14 is part of an application program 16.

The service director 12 contains several procedures which define internal services 18. The service director 12 also has access to data structures which define service tables 20. While executing, the service director 12 can make procedure calls to library procedures 22, 24, 26, and 28.

The application program 16 can perform any end use or system function, and is typically written in a high level language such as C or COBOL. Decreasingly, the application 16 may be written in assembly language. The stub procedure 14 is a small procedure which is linked to the application 16 at link time.

The stub procedure 14 is called in the manner of any other procedure by the application 16. Parameters passed to the stub procedure 14 describe a system library procedure, or service, whose execution is desired. The stub procedure 14 uses these parameters to make a procedure call to the service director 12.

Since different programming languages use different procedure calling conventions, a different stub procedure 14 must be provided by the system for each programming language supported. However, a single stub program 14 makes all calls to the service director 12 for all desired library services.

The service director 12 is the interface used by application programs 16 when library procedures are called. The service director 12, when called, examines the parameters passed to it and determines which library procedure is to be invoked. Certain procedures are preferably included directly in the code of the service director 12. These procedures can be referred to as internal services 18, or environmental services. These procedures 18 are typically those which are executed often, and are not of great complexity. Efficient calls to these procedures 18 are preferred in order to prevent system performance degradation. Typical system services which can be included as internal services 18 to the service director 12 include program and storage management, time of day and similar systems services, and initialization and control routines directed toward operation of the service director 12 itself.

When an application 16, through the stub 14, calls the service director 12, a procedure to be performed is identified by parameters passed thereto. Once the desired procedure is identified, the service director must determine where the procedure is stored in the system, what parameters it requires, and the language the procedure was originally written in. This last item indicates the procedure calling convention which must be used when the desired library procedure is invoked. The service director 12 finds this information from the service tables 20. The service tables 20 are data structures which provide a mapping from the names of system library procedures to the information just described, and can be implemented in any of several well known data structures.

Once the service director 12 has identified the library procedure to be invoked, it arranges any parameters to be passed thereto appropriately for the calling convention expected by the procedure, and then calls it. Any results returned by the procedure are passed to the service director 12. If necessary, the service director 12 reformats the results, and returns them to the stub procedure 14.

In many instances, an application program 16 and a called library procedure will be written in the same language, so that little difficulty is encountered in making the required procedure calls. In other cases, an implementation of one language may pass parameters and return results in registers, while an implementation of another language could use a stack. The service director 12 "knows" what is necessary to translate between one calling convention and another, and makes these changes in a fairly straight forward manner. For example, data and pointers can be moved from registers to a stack, and vice versa.

In a preferred embodiment, an application must make an initialization call to the service director 12 prior to invoking any system library procedures. This call passes parameters which identify the application, and allow the service director 12 to locate the appropriate service tables 20. Different applications may use different sets of service tables. This call can also provide a pointer to a common control block whose function will be described in connection with FIG. 2.

It is also preferable for the application 16 to make a termination call to the service director 12 after all calls to library procedures are completed. This allows the service director 12 to free allocated areas of memory, and generally clean up after the application 16.

Figure 2:
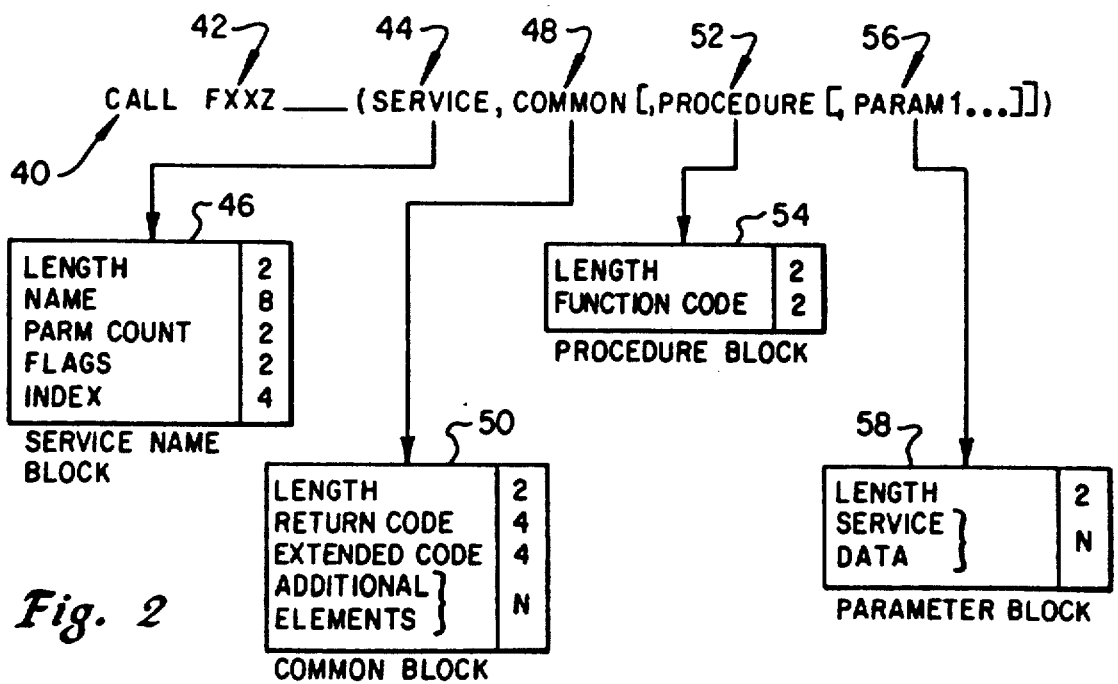
FIG. 2 is a diagram illustrating a format for calling library routines.

FIG. 2 illustrates a typical command for use within the application 16 for invoking a library procedure. A command line 40 is a call to a stub procedure 14 having a stub procedure name 42. In some languages, such as FORTRAN, the word CALL actually appears as part of the statement invoking the stub procedure 14. In many other languages, the word CALL is not used, and the stub procedure 14 is invoked merely by using its name 42.

The stub procedure name 42 is preferably relatively arbitrary, so that it tends to not conflict with the use of descriptive procedure names. In order that a system linker will be able to link in the stub 14 appropriate to the language of the application program 16, the stub procedure name 42 indicates which language is being used. In FIG. 2, a is shown, and this is preferably replaced by one or more characters indicating the language being used. For example, these characters could be "C", "CBL" (for COBOL), or "ASM" (for assembly language). In the alternative, the same stub procedure name is used for all languages, and each compiler identifies the appropriate stub procedure 14 by placing the necessary external linkage information in the object file it creates when it compiles the application program 16.

The first parameter passed to the stub procedure 14 is a service parameter 44, which is a pointer to a data structure called a service name block 46. The second parameter to be passed is a common block identifier 48, which contains a pointer to a common block 50. The third parameter 52 is a pointer to a procedure block 54, and additional parameters 56 are each pointers to separate parameter blocks 58.

The parameters 52 and 56, shown in square brackets, are optional in some cases. That is, some internal service calls, such as time of day, may require only the parameters 44 and 48, depending upon implementation.

The service parameter 44 points to the service name block 46, which is an allocated block of memory containing several different items of information. The numbers shown in block 46 indicate a number of bytes which that field occupies. In the preferred embodiment, the first field in the service name block 46 is a LENGTH field, which indicates the total number of bytes in the service name block 46. The next field is a NAME field, which is the name of a service. A PARM COUNT field indicates the number of parameters which are to be passed to the called service. This count is used to determine whether a procedure parameter 52 is being passed, and how many parameter items 56 are being passed.

A FLAGS field is used to pass information from the stub procedure 14 to the service director 12. One type of information typically passed is the identity of the calling language. All of the stub procedures 14 for different languages call the service director 12 at the same entry point, and the FLAGS field in the service name block indicates to the service director 12 which calling convention is being used.

The INDEX field is used to more quickly identify the location of information about a particular service. The first time a service is invoked, the service director 12 must search through the service tables 20 in order to match the NAME field with the various names available in the tables 20. Once this match has been made, the service director 12 places an identifier for that entry in the tables 20 into the INDEX field. The identifier can be, for example, an address for that entry, or an index into a table. Whenever various functions of this service are called in the future, this identifier is used to access the appropriate entry in the service tables 20 directly.

The common block 50 is used by the service director 12 to return status and other information to the application program 16. A LENGTH field indicates the size of the common block 50. A RETURN CODE field is used to return status codes to the application program 16. By convention in a preferred embodiment, a positive value for the return code simply passes through any return code generated by the called library procedure. Also by convention, a negative value for a return code is used by the service director 12 to indicate a failure within its area of responsibility. Such failures could include, for example, the inability to locate a desired library procedure. The EXTENDED CODE field provides an additional ability to return error codes.

The ADDITIONAL ELEMENTS fields are optional, and may be used to transfer data or pointers to data back to the application program 16.

In addition to the LENGTH field, the procedure block 54 includes a FUNCTION CODE field. This field is a number indicating which function of a service is desired.

In a preferred embodiment, it is anticipated that related functions will be grouped together, and this grouping is called the service. In order to access one of these procedures, a name applied to the service as a whole is required, and is found in the service name block 46, and an indication of which procedure within the service is requested is found in the procedure block 54. For example, a group of routines for performing matrix manipulation can be identified by a single service, with the procedure block 54 indicating whether calculation of a determinant, matrix multiplication, inversion, or other matrix manipulations are requested.

Each parameter block 58 is used to transmit one parameter to the requested library procedure. The SERVICE DATA field in the parameter block 58 can contain the data directly, or can contain a pointer to the data. The type of data contained in each parameter block 58 is dependent upon what each individual library procedure expects, and will be specified in the documentation for that particular library procedure.

Figure 3:
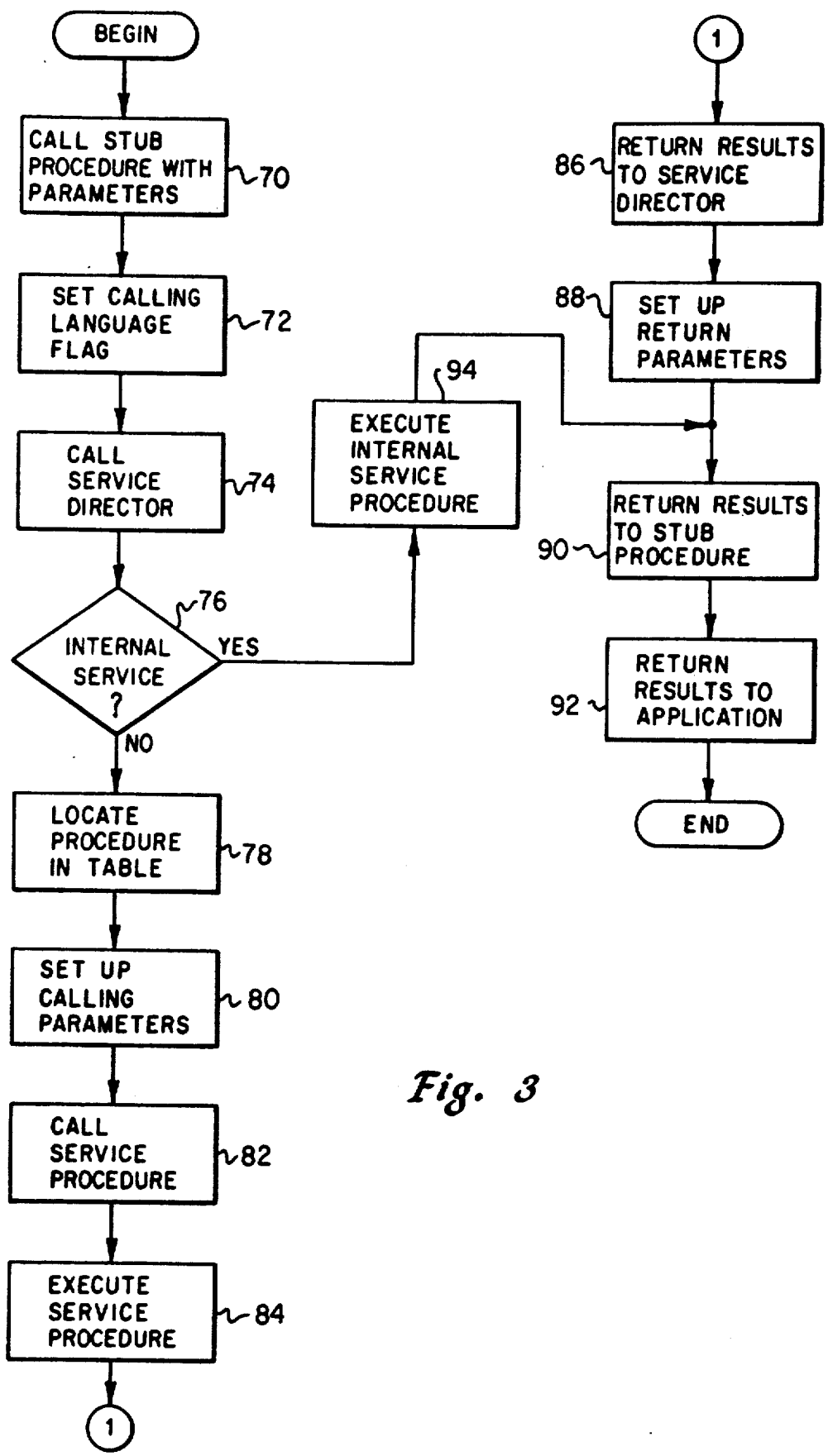
FIG. 3 is a flowchart illustrating steps taken to call a library procedure on a local machine.

FIG. 3 illustrates the steps which occur during a call of a library procedure, which is available on the local node, by an application program 16. The flowchart of FIG. 3 assumes that any initialization calls which need to be made to the service director 12 have already been made. FIG. 3 illustrates only the sequence of events which occur during a single call to a library procedure.

First, the application program 16 calls the stub procedure and passes parameters to it 70. These parameters, as described in connection with FIG. 2, preferably identify at least a service and common block, and optionally a procedure identifier and parameters if required. The stub procedure then sets a calling language flag 72. This flag indicates to the service director 12 the programming language of the application program 16, thereby indicating which calling conventions are used by the application 16 and stub procedure 14.

The stub procedure then calls the service director 74, which determines if the request is for an internal service 76. If the requested procedure is not internal to the service director 12, the service director 12 locates the desired procedure in the service table 78. As described above, the service table entry indicates that information necessary for the service director 12 to properly call the requested library procedure. In the method of FIG. 3, the service table entry indicates that the desired procedure is available on the local node.

The service director 12 then sets up the parameters to call the library procedure 80, and calls it 82. The service procedure executes in its normal manner 84, and returns any generated results to the service director 86.

The service director 12 sets up its return parameters 88 to match the calling convention of the application program 16 as indicated by the flag set in step 72. The results are then returned to the stub procedure 90, which in turn returns them to the application program 92.

In step 76, if the service director 12 detects that an internal service is requested, it executes such internal procedure 94 and goes to step 90. The service director 12 understands the parameter passing mechanism used by the application program 16 because of the calling language flag set in step 72, and can handle any required translation directly.

Figure 4:
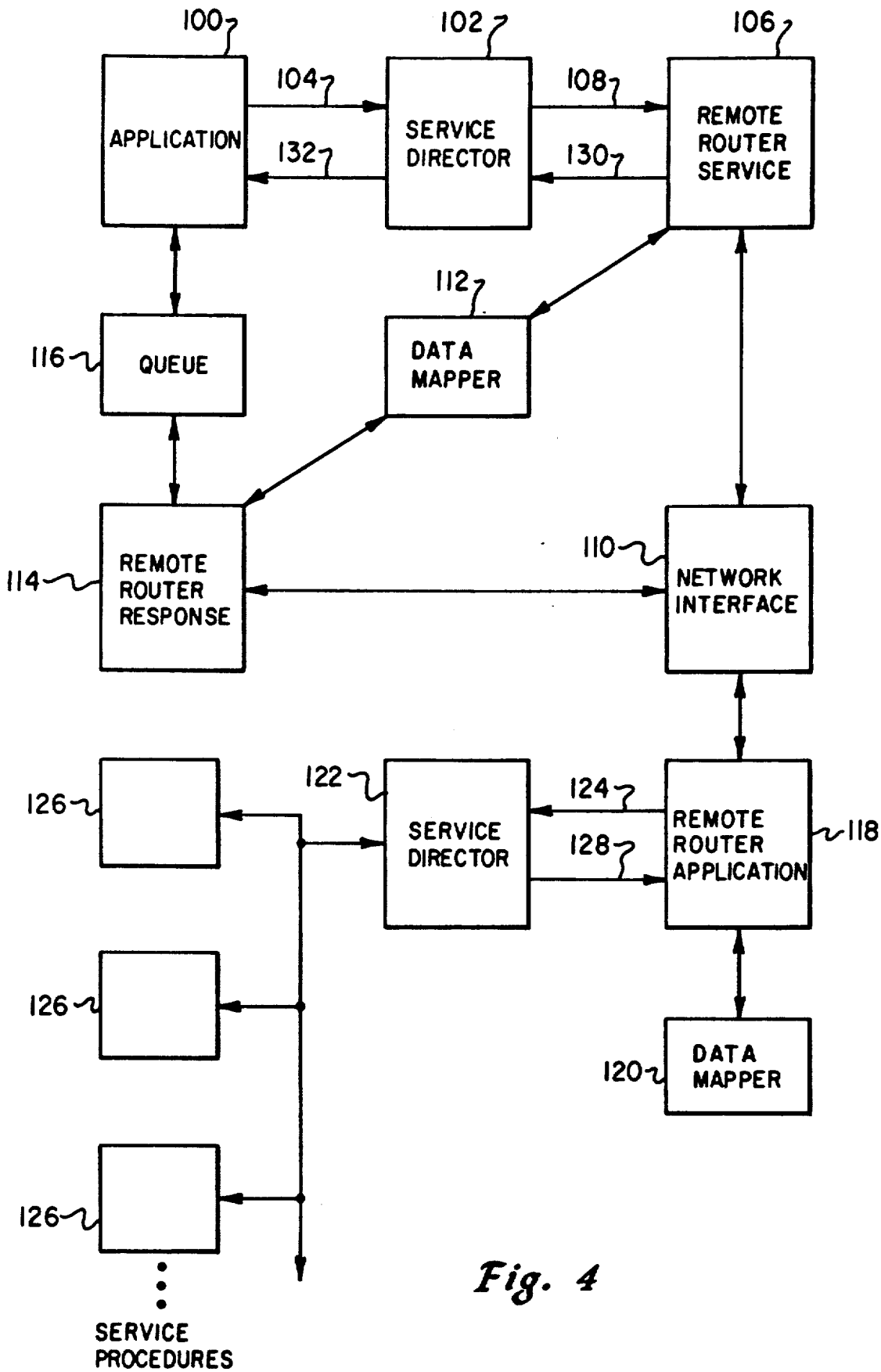
FIG. 4 is a block diagram of a system for calling library procedures on a remote machine.

FIG. 4 is a block diagram of an embodiment of the system in which an application running on one node of a network can call a service procedure on another node of the network. The system shown in FIG. 4 can be used for operation in several different remote modes, which are separately set forth in the flowcharts of FIGS. 5-8. For ease of understanding, not all of the details shown and described in connection with FIG. 1 are included in FIG. 4, although a preferred embodiment uses the same techniques.

Referring to FIG. 4, an application program 100 invokes a service director 102 through a procedure call 104. The service director 102 invokes a remote router service 106 with a procedure call 108. The remote router service 106 is a library procedure which sets up remote communication with a remote node connected to the local node through a network.

The remote router 106 communicates with a network interface 110 in order to transfer data and results over the network. The network interface 110 represents all of the hardware and software interfaces and connections necessary to connect 2 nodes in the network. Network architectures differ greatly from each other, and the details of network linkages do not form a part of the present invention, so details of the network interface 110 are not shown. The remote router service 106 also communicates with a data mapper 112, which controls formatting of messages transferred over the network. A remote router response procedure 114 communicates with the network interface 110 in selected situations. In these situations, the response procedure 114 receives results returned over the network from a remote node, and placed them into a queue 116 for later retrieval by the application 100. The response procedure 114 communicates with the data mapper 112 in order to interpret the format of the returned results and reformat them into a form expected by the application 100.

At the remote node, a remote router application 118 receives data from the network interface 110. This data describes a service procedure which is to be invoked at the remote node. The remote router application procedure 118 communicates with a data mapper 120 at the remote node in order to extract the necessary information from the communication stream, and invokes a service director 122 with a procedure call 124. At the remote node, the remote router application procedure 118 calls the service director 122 as an application program, and requests the service director 122 to invoke a service procedure as described in connection with FIG. 1. The service director 122 makes any calling convention translations which are necessary and invokes a requested service procedure 124.

When the requested procedure 124 terminates, it returns a result, if any, to the service director 122, which in turn returns the result to the application procedure 118 by a procedure return 128. The application procedure 118 communicates with the data mapper 120 to format the results for communication over the network, and returns them to the originating node through the network interface 110.

Depending on the calling method being used, the results returned by the application procedure 118 can be returned to the response procedure 114 for placement into the queue 116, or they can be returned directly to the remote router service procedure 106. In the latter case, the service procedure 106 returns the results to the service director with a procedure return 130, which in turn uses a procedure return 132 to return the results to the application 100.

The system described in connection with FIG. 4 can use several different techniques for communicating between the various remote router procedures at the local and remote nodes. The remote service 126 can be invoked with a "synchronous" technique, meaning that the calling application waits until results are returned before proceeding. Remote services may also be invoked in an "asynchronous" manner, meaning that the application continues to perform further processing while the remote node invokes the service procedure, and fetches the results from the queue 116 after they have been placed there by the response procedure 114.

It is also possible to have the application procedure 110 initiate a new network connection each time a remote call is made, or a single connection can be set up for making several different remote calls. Making a new connection for each remote call generally requires more overhead for setting up the connection, but avoids having dedicated communication links on the network which are idle part of the time. The technique of opening a single communications link for several remote procedure invocations can be referred to as making a remote request with START/STOP.

As described above, the application 100 must initialize the service director 102. The service tables (not shown separately in FIG. 4) identify the location of all of the service procedures which can be called by the application 100 including those which are invoked on remote nodes. For remote services, the remote node and any communications links to it must be identified, as well as the information which is necessary for the remote service director 122 to invoke the remote service 126. The communication protocols which are used to communicate with the remote node, as well as the parameters which are passed to remote procedures, are stored in the data mapper 112 so that it will know how to format and extract data for communications with the remote node. The remote data mapper 120 is given similar information when the remote router application procedure 118 is initialized in order to enable access to service procedures 126 from other nodes.

Figure 5:
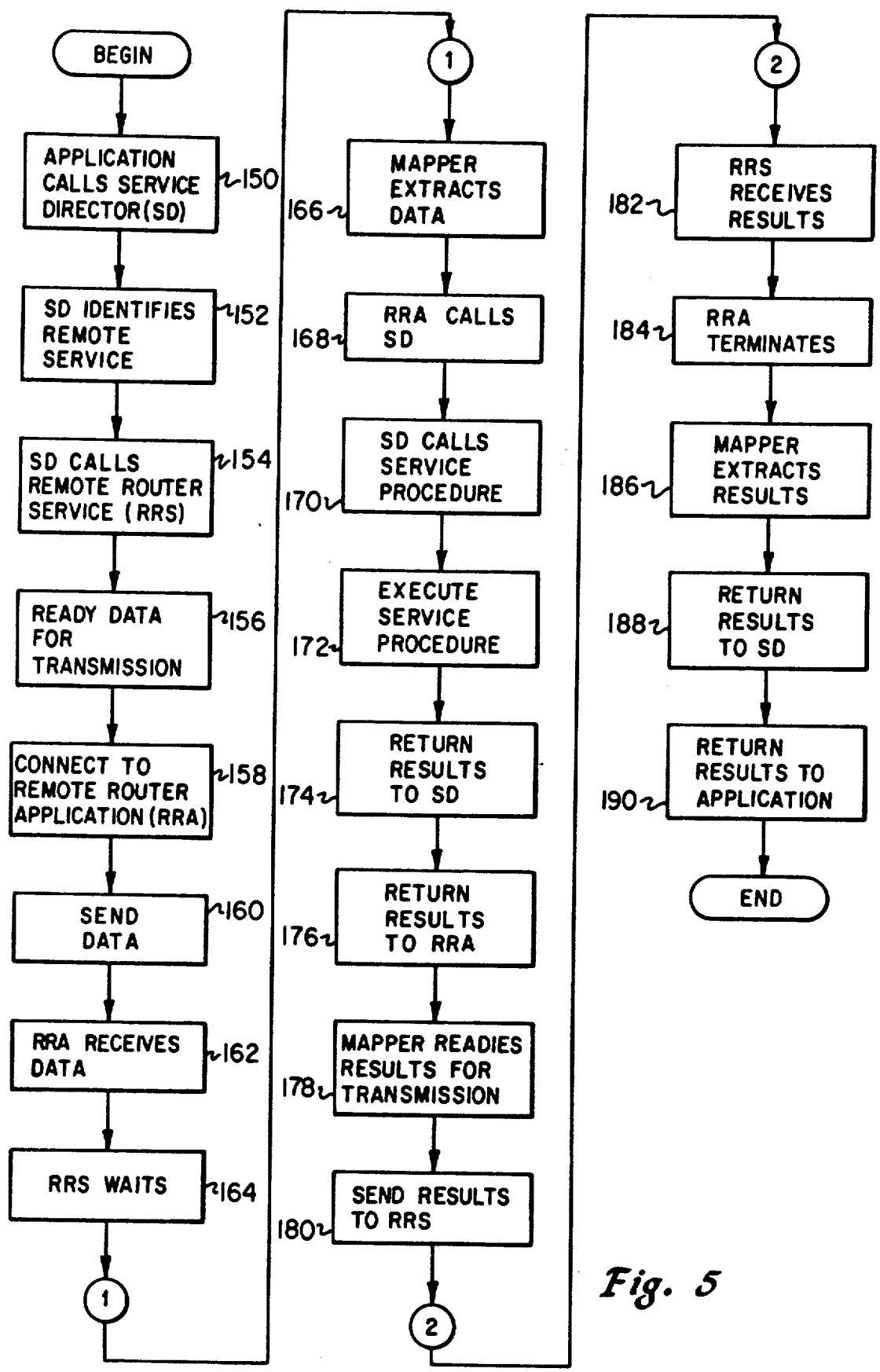
FIG. 5 is a flowchart illustrating steps taken to make a synchronous call to a library procedure on a remote machine.

FIG. 5 illustrates a synchronous remote request without START/STOP. Referring to FIG. 5, the application procedure 100 calls the local service director 150, and passes parameters thereto as described in connection with FIG. 2. The service director 102 searches its service tables and locates the entry for the requested service. For services which are defined as remote services, this fact is identified in the service tables 152. The service director 102 then invokes the remote router service 154.

As described above, a data mapper routine 112 was associated with each remote service in the service tables at the time the remote services were defined. The data mapper 112 readies the service identifier and parameters for transmission over the network 156 by creating communications blocks appropriate to the protocol used by the network. Only that information actually utilized at the remote node is transferred, so that some entries in the service name block 46 and common block 50 need not be transferred. The data mapper 112 also identifies which remote data mapper 120 should be used to correctly extract the transferred parameters.

A connection is made to open up a network communications link to the remote router application procedure 158. The data, which includes the service procedure to be invoked and all necessary parameters, is then sent over the network 160, and received by the remote router application procedure 162. Since this is a synchronous call, the remote router service 106 at the local node then waits until it receives a reply 164.

At the remote node, the remote router application 118 communicates with the data mapper 120 which extracts the data 166. Using the service call identifier and parameters extracted by the data mapper 120, the remote router application 118 invokes the service director 122 as does any other application 168. The service director 122 calls the appropriate service procedure 170, which executes in the normal manner 172. Upon completion, the selected service procedure 126 returns its results to the service director 174, which in turn returns its results to the remote router application 176.

The data mapper 120 then readies the results for communication over the network 178, and the remote router application 118 returns the results to the remote router service 180. Once the remote router service 106 has received the results 182, the remote router application 118 terminates 184. The data mapper 112 extracts the results 186 into a format understood by the service director 102, and returns them to the service director 188. Service director 102 then in turn returns these results to the application 190, which continues processing.

Figure 6A:
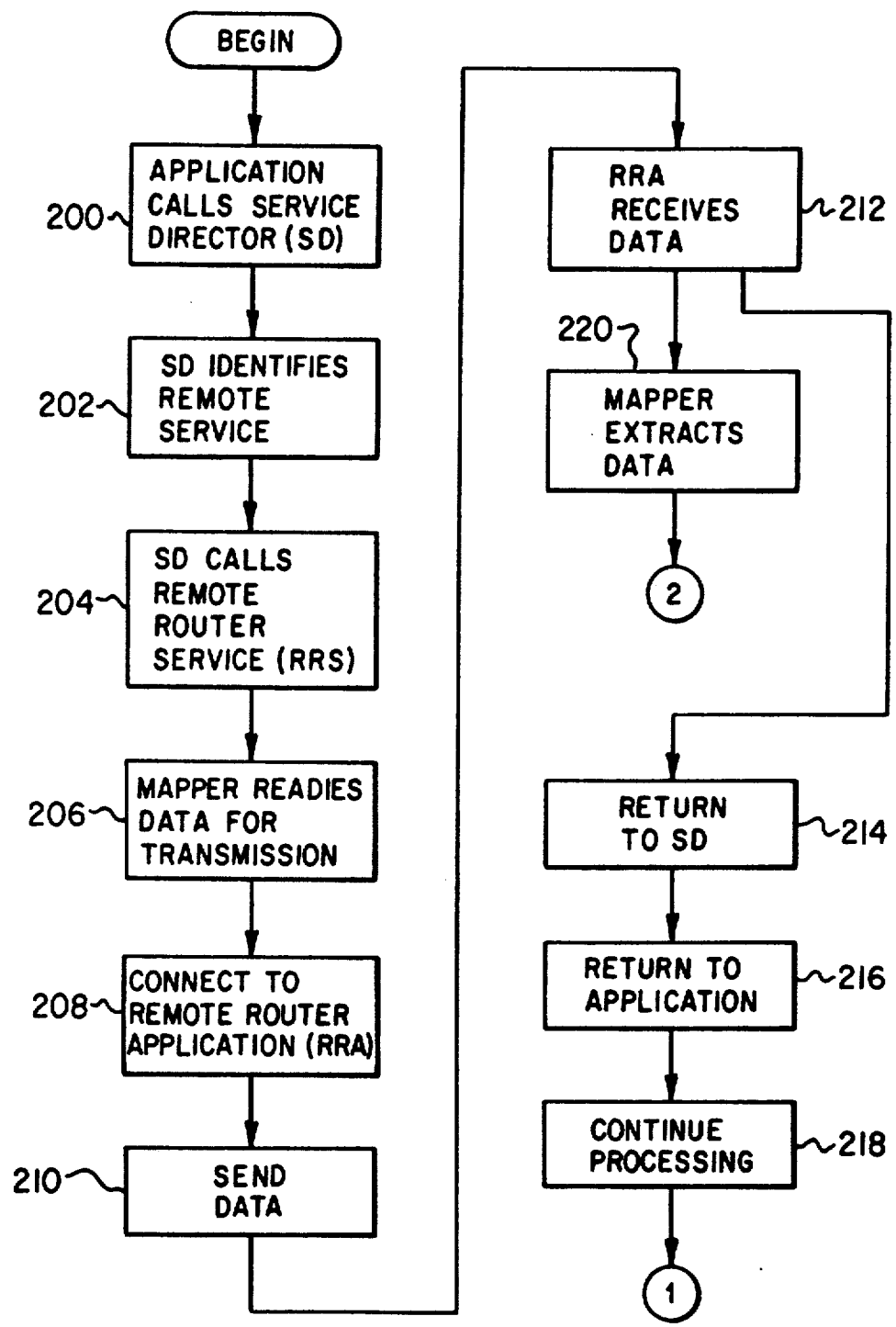
FIGS. 6a and 6b is a flowchart illustrating steps taken to make an asynchronous call to a library procedure on a remote machine.
Figure 6B:
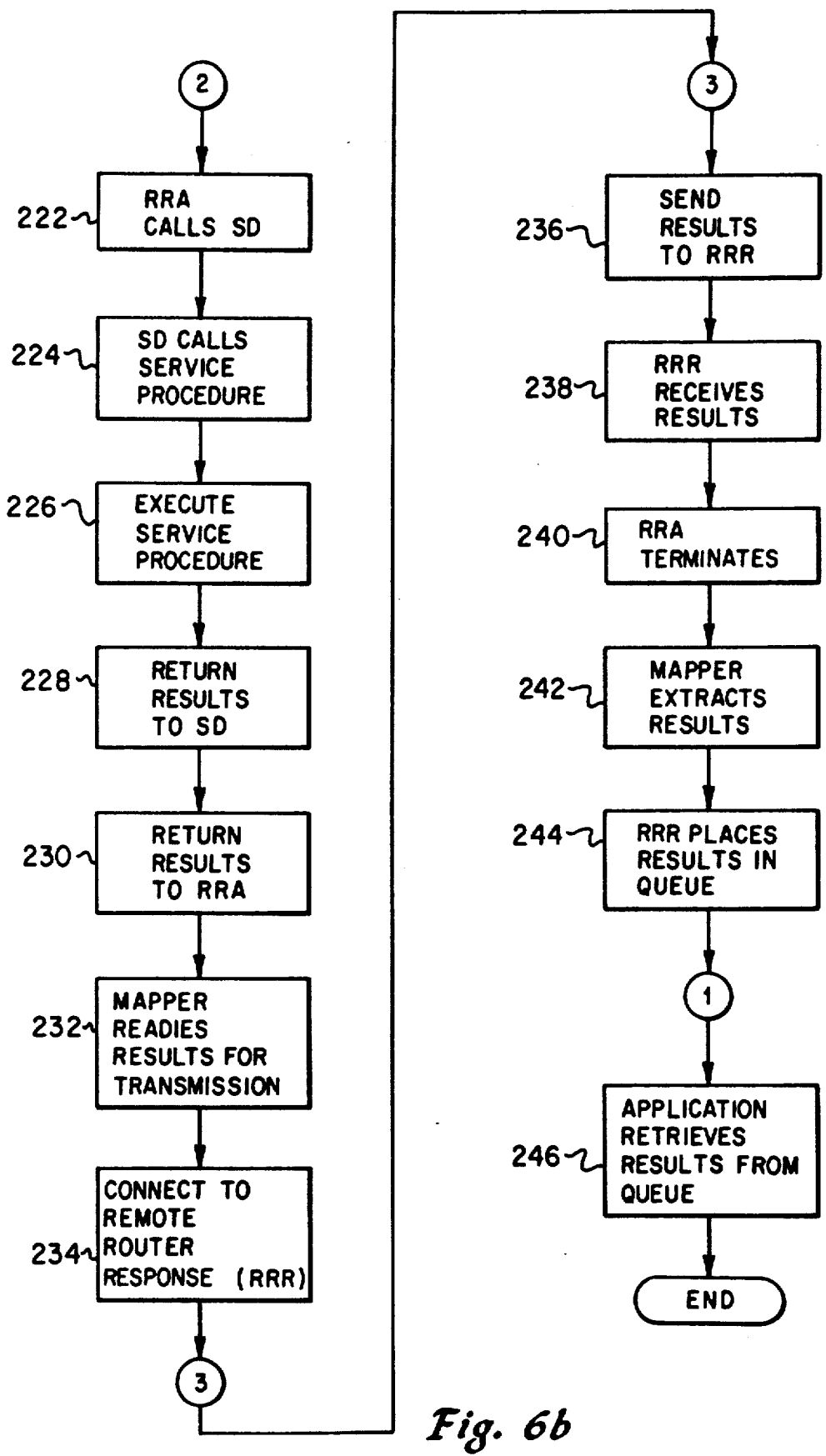

A preferred method for making an asynchronous remote request without START/STOP is shown in FIG. 6. The application program calls the service director 200, which identifies the requested service procedure as a remote service in the service tables 202. The service director then calls the remote router service 204, which communicates with the data mapper in order to ready the service procedure identifier and parameters for transmission 206. A connection is then initiated to the remote node in order to establish a communications link 208, and the data describing the remote service procedure and its parameters is then sent to the remote node 210. When the remote router application at the remote node receives the data 212, the local remote router service executes a procedure return to the service director 214, which in turn executes a return to the calling application 216. The application then continues processing 218, and can check for returned results in the queue 116 at a later time.

When the remote router application 118 receives the service procedure and parameter data 212, the remote data mapper, which was identified by the data mapper 112 at the local node, extracts the procedure identifier and parameters 220. The remote router application then, acting as any other application program, calls the service director 222, which calls the appropriate service procedure 224. The service procedure executes 226 and returns any results to the service director 228. The service director returns the results to the remote router application to 230, which formats them for transmission over the network by communicating with the mapper 232.

Since this was an asynchronous request, the results are not returned to the remote router service 106 at the local node which originally requested execution of the service procedure. Instead, when the data is sent (step 210) to the remote node, the transaction is identified as an asynchronous call, and a remote router response procedure 114 is identified to which the results should be returned.

Therefore, the remote router application 118 initiates a connection to the identified remote router response procedure 234. Once the connection is established, the results are sent to the response procedure 236. Once the response procedure 114 receives the results 238, the remote router application 118 terminates 240. The data mapper at the local node then extracts the results 242, and the response procedure places them into the queue 244. At some later time, the application program retrieves the results from the queue 246, and continues processing. If the results have not yet been placed in the queue 116 at the time the application program 100 tries to retrieve them 246, the application program can either wait until the results are available, or continue further processing and try again at a later time.

As described above, START/STOP transactions can be used to minimize the overhead required to set up the communications links between the local and remote nodes. In the methods described in connection with FIGS. 5 and 6, a new network communication link must be set up each time a remote service procedure 126 is invoked. If an application program 100 knows that multiple consecutive invocations of a single or related service procedures 126 will be made, it is more efficient to set up a single communications link between the nodes and utilize that link for several transactions.

Figure 7:
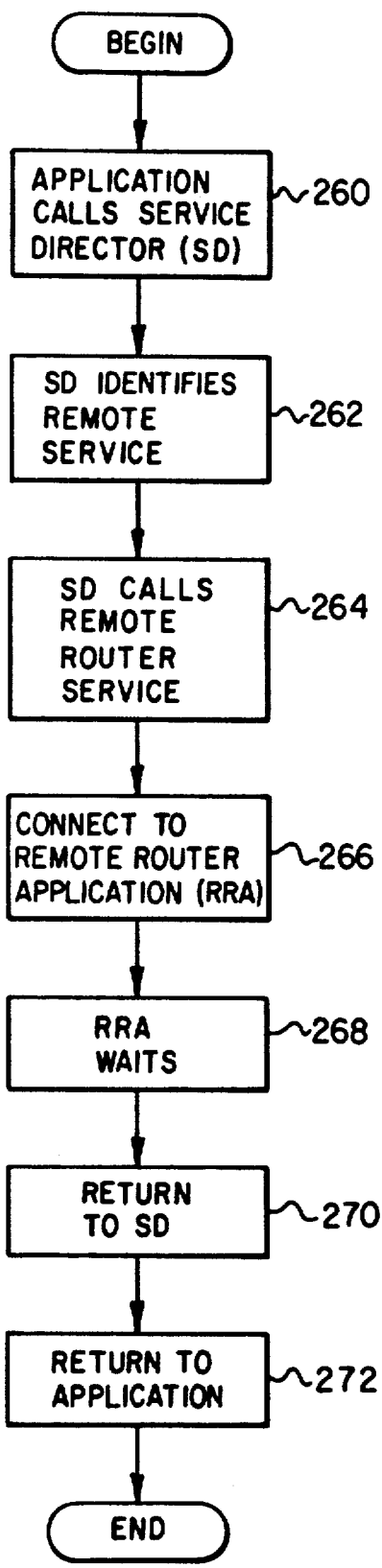
FIG. 7 is a flowchart illustrating steps taken to initiate a communications link for a series of calls to library procedures on a remote machine.
Figure 8:
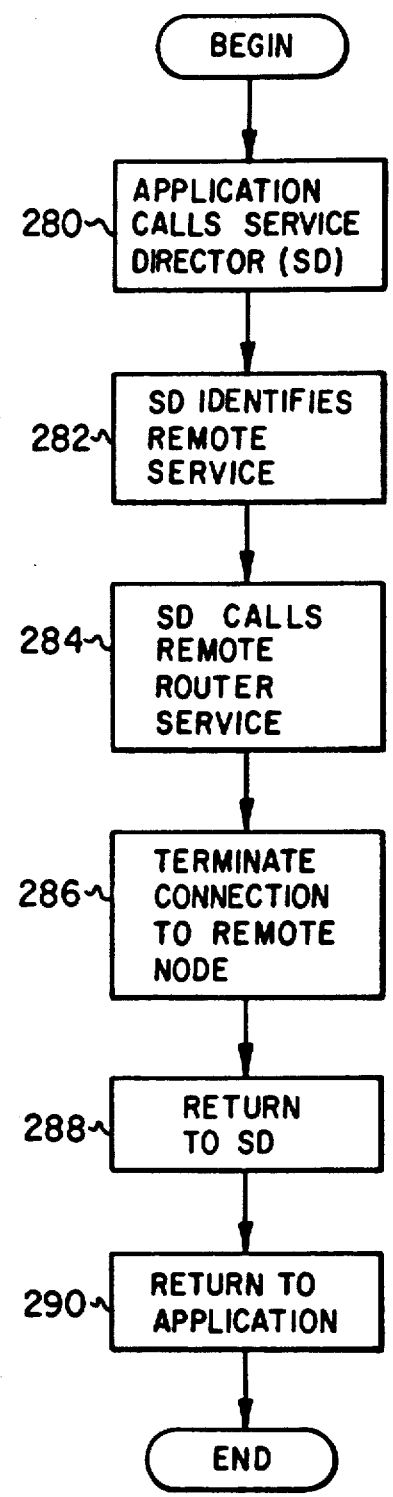
FIG. 8 is a flowchart illustrating steps taken to terminate a communications link for a series of calls to library procedures on a remote machine.

FIGS. 7 and 8 show a preferred method for initiating and terminating a series of START/STOP transactions. The applications program 100 initiates a series of START/STOP transactions, performs the transactions in a method very similar to that described above, and finally terminates the series.

Since the system described herein is transparent to the application program 100, it will often not be known whether a particular requested service procedure is performed locally or on a remote node. Therefore, an application program 100 can initiate and terminate a series of transactions as if they are remote service procedures. If the service director, through searching the service tables, determines that the requested service is actually locally available, the initiate and terminate commands for a series of transactions are simply ignored. Thus, an application program 100 can simply initiate and terminate a series of related requests in every instance, and whether or not a particular request is local or remote will have no adverse affect. In fact, a particular request may be locally available at some time, and remotely available at another time, and nothing will appear different to the application program. If an asynchronous request is made, the service director can merely return the results directly to the queue 116 instead of the application program 100.

Referring to FIG. 7, a preferred method for initiating a series of related transactions as shown. The application program 100 calls the service director 102 to request that a START/STOP series be initiated 260. The service procedure 126 which will be called during this series is identified at this time. The service director 102 identifies the requested service procedure as a remote service 262, and invokes the remote router service 106 with a procedure call 264. As described above, if the requested service procedure is available at the local node, the remainder of the steps of FIG. 7 are simply ignored.

The remote router service 106 initiates a connection to the remote router application procedure 266. The remote router application procedure 118 then waits to receive data 268, and the remote router service 106 of the local node returns to the service director 270. The service director 102 then turns to the application program 272 and the process is complete. At this time, a communications link has been established over the network, and does not need to be reestablished in order to send a request to the remote node.

Referring to FIG. 8, when a START/STOP series is completed, the application program 100 calls the service director 102 to terminate the communication link 280. The service director 102 identifies the service procedure as a remote service 282, and calls the remote router service 284. As is the case with initiating the START/STOP link, if the identified service procedure is available locally the command to terminate the link is simply ignored.

The remote router service 106 then communicates to the remote router application 118 that the START/STOP link is being terminated, and terminates the network connection to the remote node 286. The remote router service 106 then returns to the service director 288, which in turn returns to the application 290.

The method used for invoking a remote service procedure 106 after a START/STOP series has been requested is virtually identical to that used without START/STOP. Instead of initiating and terminating connections, the available connection is used. For a synchronous request, the steps shown in FIG. 5 are the same, except that step 158 is eliminated, and step 184 does not terminate the remote router application 118, but instead causes it to wait for a next request. The remaining steps are the same.

For an asynchronous request with START/STOP, the flowchart shown in FIG. 6 indicates the appropriate steps with a few exceptions. The connection steps 208 and 234 are eliminated, and termination step 240 instead becomes a wait for next request step for the remote router application 118.

Thus, the same system can be used for requests with or without START/STOP, with the difference that a flag is needed to indicate what kind of transaction is required. The extra initiation and termination procedures must also be used when START/STOP requests are made.

The system and method described above allow library procedures to be invoked on remote nodes over a network. The location of the library procedures need not be known to the applications programs, and can in fact change from time to time. The languages used to write the library procedures can also be changed, as it need not match those of the applications program.

Thus, a single set of library routines can be supplied to support all machines connected to a network. Applications programs can be written to access the library procedures through a language independent interface, and it does not matter if the library procedures they require are located on the local node or elsewhere. This allows library procedures which operate more efficiently on certain machines, such as vector operations using specialized hardware, to run on the more efficient machines.

While the invention has been particularly shown and described with reference to a preferred embodiment, it will be understood by those skilled in the art that various changes in form and detail may be made therein without departing from the spirit and scope of the invention.

We claim:

1. A method for calling a service procedure residing at either a local node or a remote node of a computer network from an application program executing on the local node, the method comprising the steps of generating an initialization call from the application program identifying the application program;

responsive to the initialization call, selecting service directories having locations of library procedures, mappings from names of library procedures to sets of required parameters and indicating the language of each library procedure;

generating a procedure call from the application program upon execution of a native language construct, the procedure call including a parameter set;

responsive to the procedure call, determining the local or remote node where the service procedure resides from a service directory, a service procedure identifier and a language in which the application program is written;

determining if the language of the application program and the language of the service procedure use different calling conventions;

responsive to the respective languages of the application program and the service procedure utilizing different calling conventions, reformatting the parameter set for the service procedure;

upon determination that the service procedure is located at the local node, calling the service procedure and passing the parameter set thereto;

upon determination that the service procedure is located on the remote node, calling a routing procedure on the local node from the service directory with the service procedure identifier and the parameter set;

calling a routing procedure on the remote node from the local node routing procedure with the service procedure identifier and the parameter set;

at the remote node, calling the service procedure on the remote node corresponding to the procedure identifier; and executing the service procedure at the remote or local node, as appropriate, utilizing the parameter set.

2. A method for calling a service procedure as set forth in claim 1, further comprising the steps of:

upon completion of execution, returning a result parameter set from the service procedure to the local node routing procedure;

formatting the result parameter set for the application program; and returning the result parameter set to the application program.

3. A method for calling a service procedure as set forth in claim 2, wherein said step of returning the result parameter set to the application program comprises the steps of:

placing the result parameter set in a queue accessible by the application program; and reading the result parameter set from the queue into the application program.

4. A computer network for processing procedure calls, the computer network comprising:

a local node;

computer means located at the local node for executing an application program and thereby generating, an initialization call identifying the application program, and a procedure call in a native language construct for calling a procedure stored at the local node or at one of a plurality of remote nodes and passing a parameter set;

means located at the local node responsive to the initialization call for, selecting mappings from names of procedures to sets of required parameters, locations on the local and the remote nodes of a plurality of procedures, and the language of each procedure;

means located at the local node responsive to a procedure call for generating a procedure identifier, for identifying the language of the application, for determining from the selected mappings and the identification of the procedure whether it is located at the local or at a remote node and, responsive to the application and the called procedure being in different language groups, for translating the parameter set to a convention compatible with the language of the called procedure;

means located at the local node responsive to determination that the procedure is located at the local node for calling the procedure utilizing the parameter set;

means located at the local node responsive to determination that the procedure is located at the remote node for initiating establishment of a communications session between the local node and the remote node and passing the procedure identifier for the called procedure and the parameter set to the remote node during the communications sessions;

means located at the remote node responsive to establishment of the communications session and receipt of a parameter set and identification of the procedure during the communications session for generating a procedure call for the called procedure;

means located at the remote node for executing the called procedure utilizing the parameter set; and means located at the remote node for returning results generated by the procedure to the local node.

5. A computer network for processing procedure calls as set forth in claim 4, wherein:

the means for returning the result parameter set to the local node does so during the communications session; and the means for returning the result parameter set translates the result parameter set to a convention compatible with the language of the calling procedure and returns the result parameter set to the local node.

6. A computer network for processing procedure calls as set forth in claim 5 wherein:

the procedure call responsive means at the local node include a first interface callable by the application program in a predetermined format, wherein said first interface calls the communications session initiating means; and the means for returning results include a second interface in a second predetermined format, wherein said second interface calls a procedure corresponding to the procedure identifier received during the communications session.

7. A computer network for processing a service procedure as set forth in claim 5, further comprising:

queue means located at the local node for holding the result parameter set returned from the remote node for later availability to the application program.

8. A computer network for processing a procedure as set forth in claim 5, wherein the result parameter set returned from said remote node is returned to the application program by said procedure indicating means.

* * * * *